(12) United States Patent  
Masunaga et al.

(10) Patent No.: US 9,981,664 B2  
(45) Date of Patent: May 29, 2018

(54) CONTROL DEVICE OF VEHICLE

(71) Applicant: TOYOTA JIDOSHA KABUSHIKI KAISHA, Toyota-shi (JP)

(72) Inventors: Seiji Masunaga, Numazu (JP); Seiji Kuwahara, Susono (JP); Takayuki Ando, Sunto-gun (JP); Yuki Aratsu, Naka-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 142 days.

(21) Appl. No.: 14/982,537

(22) Filed: Dec. 29, 2015

(65) Prior Publication Data

US 2016/0221577 A1 Aug. 4, 2016

(30) Foreign Application Priority Data

Jan. 29, 2015 (JP) ................................ 2015-016109

(51) Int. Cl.
*B60W 30/186* (2012.01)
*B60W 10/115* (2012.01)
*B60W 30/18* (2012.01)

(52) U.S. Cl.
CPC ........ *B60W 30/186* (2013.01); *B60W 10/115* (2013.01); *B60W 30/18027* (2013.01); *B60W 2540/10* (2013.01); *B60W 2540/12* (2013.01); *B60W 2710/021* (2013.01)

(58) Field of Classification Search
CPC ......... B60W 30/186; B60W 30/18027; B60W 10/115; B60W 2710/021; B60W 2540/12; B60W 2540/10
See application file for complete search history.

(56) References Cited

U.S. PATENT DOCUMENTS

| 2013/0296102 A1* | 11/2013 | Banker | B60W 10/196 |
| | | | 477/4 |
| 2016/0039403 A1* | 2/2016 | Kato | B60W 40/12 |
| | | | 701/60 |
| 2016/0214610 A1* | 7/2016 | Kotsuji | B60K 6/48 |

FOREIGN PATENT DOCUMENTS

| DE | 196 53 855 C1 | 4/1998 |
| DE | 100 40 167 A1 | 3/2001 |
| DE | 101 56 940 A1 | 5/2003 |
| DE | 10 2005 035 302 A1 | 2/2007 |
| DE | 10 2005 035 303 A1 | 2/2007 |
| DE | 10 2008 002 070 A1 | 12/2009 |

(Continued)

*Primary Examiner* — David J Hlavka  
(74) *Attorney, Agent, or Firm* — Oblon, McClelland, Maier & Neustadt, L.L.P.

(57) ABSTRACT

A control device includes a controller configured to perform control to increase a rotational speed of a power source when a brake is stepped on and accelerator opening becomes a predetermined value or larger while a vehicle stops, and thereafter, when the brake is stepped off, engage a plurality of engaging units to transmit a power, and start the vehicle. The controller includes: a parameter obtaining unit configured to obtain a parameter indicating requested acceleration when the vehicle starts; and a slip control unit configured to perform slip control on at least one of the plurality of engaging units such that difference in rotational speed occurs between frictionally engaging elements and set number of engaging units on which the slip control is performed according to a value of the obtained parameter when the vehicle starts.

7 Claims, 13 Drawing Sheets

(56) References Cited

FOREIGN PATENT DOCUMENTS

| | | |
|---|---|---|
| JP | 2005-306214 | 11/2005 |
| JP | 2010-190254 | 9/2010 |

* cited by examiner

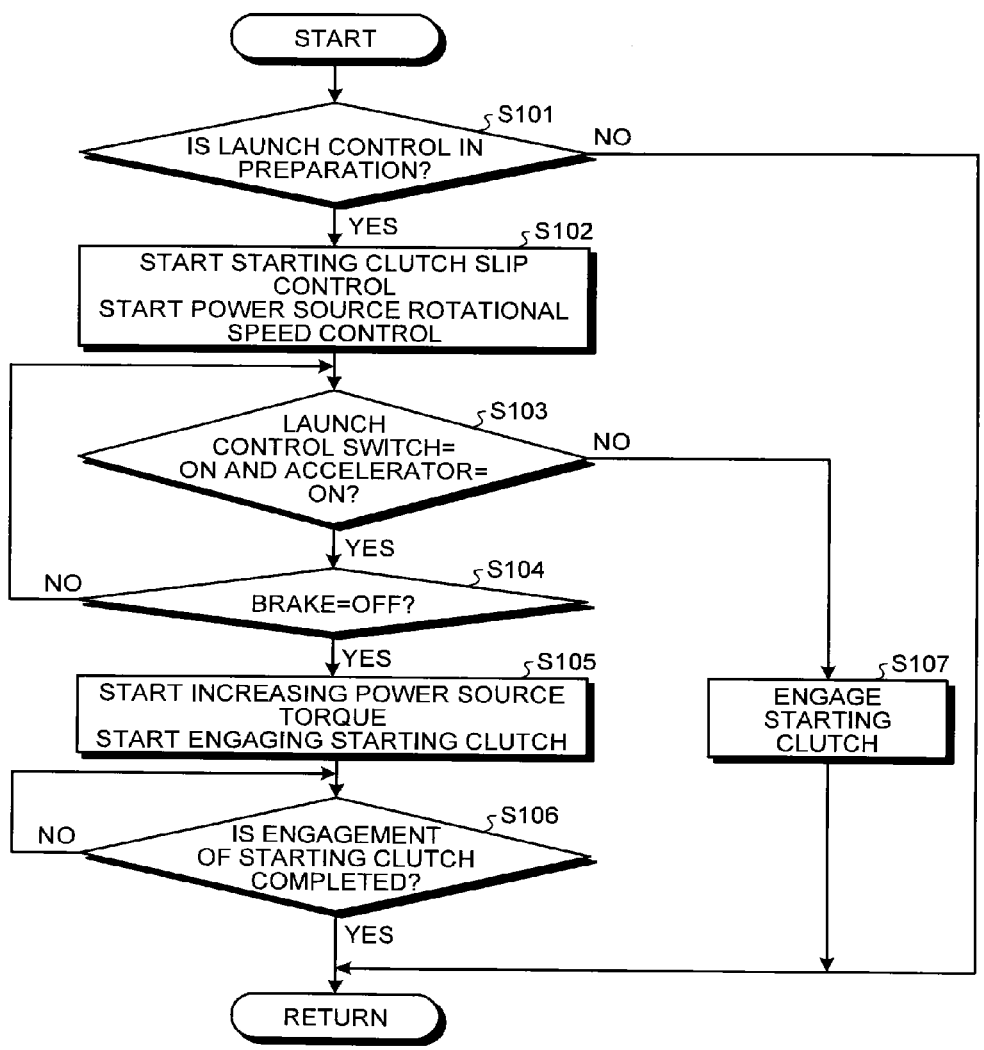

|  | C1A | C2A | C3A | C4A | B1A | B2A |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |

|  | C1B | C2B | C3B | B1B | B2B | B3B |
|---|---|---|---|---|---|---|
| 1st | ○ |  |  |  | ○ | ○ |
| 2nd | ○ |  |  | ○ |  | ○ |
| 3rd | ○ | ○ |  |  |  | ○ |
| 4th | ○ |  | ○ |  |  | ○ |
| 5th |  | ○ | ○ |  |  | ○ |
| 6th |  |  | ○ | ○ |  | ○ |
| 7th |  |  | ○ |  | ○ | ○ |
| 8th |  |  | ○ | ○ | ○ |  |
| 9th |  | ○ | ○ |  | ○ |  |

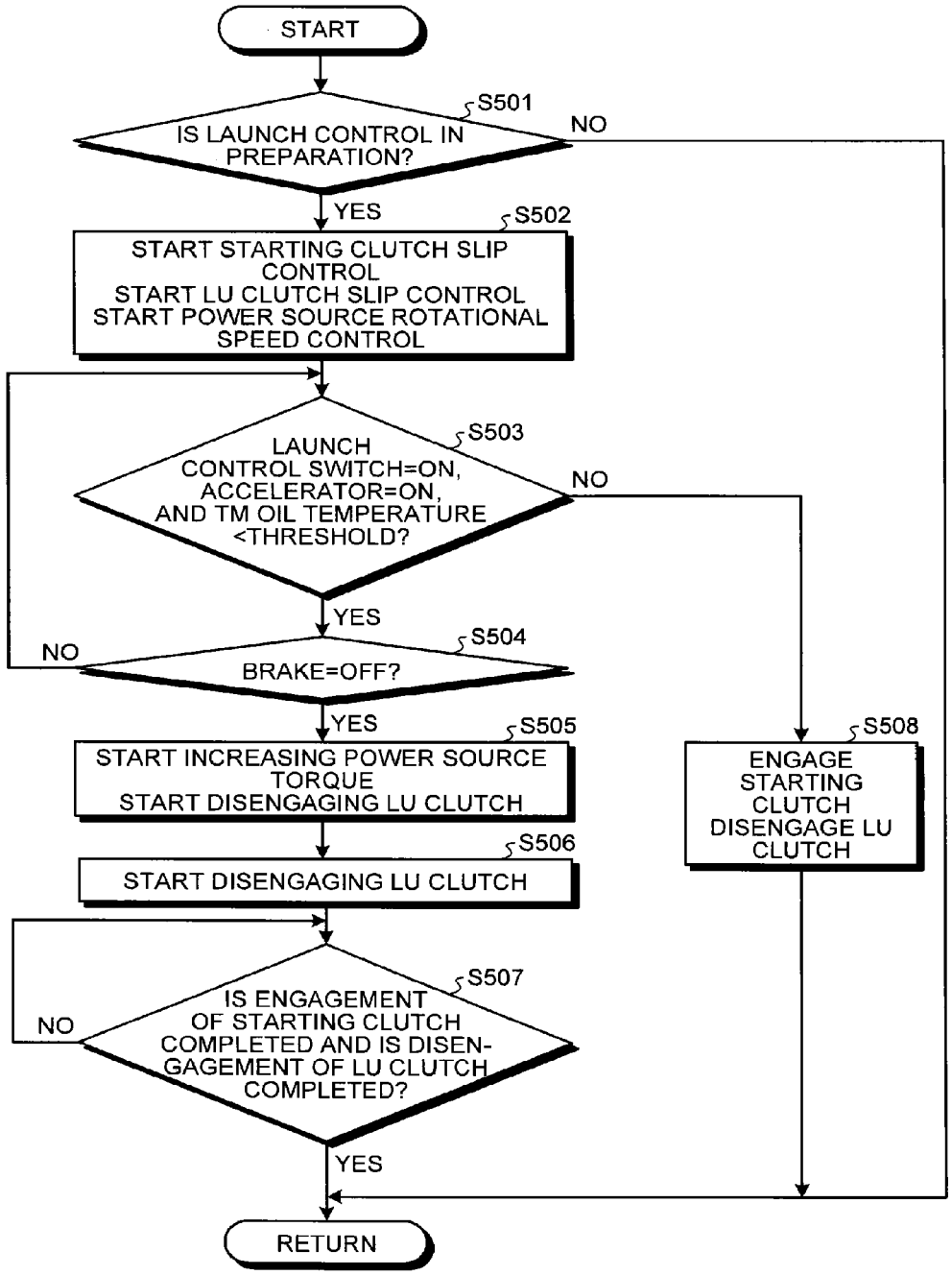

CONTROL DEVICE OF VEHICLE

CROSS-REFERENCE TO RELATED APPLICATION(S)

The present application claims priority to and incorporates by reference the entire contents of Japanese Patent Application No. 2015-016109 filed in Japan on Jan. 29, 2015.

BACKGROUND OF THE INVENTION

1. Field of the Invention

The present invention relates to a control device of a vehicle.

2. Description of the Related Art

Conventionally, starting control to increase an engine speed when a brake is stepped on and accelerator opening becomes a predetermined value or larger while a vehicle stops to enable vehicle start with high acceleration when the brake is stepped off thereafter is disclosed (Japanese Patent Application Laid-open No. 2005-306214). Such starting control is also referred to as flex start or launch control. In such starting control, an engaging unit (starting clutch) engaged when the vehicle starts is engaged from a disengaged state in an automatic transmission after the engine speed is increased, so that power is transmitted from an engine to a drive wheel and the vehicle may start.

However, in the above-described starting control, the engine speed is increased before the vehicle starts, so that difference in rotational speed between engaging elements frictionally engaging with each other (differential rotational speed) becomes larger in the starting clutch, and the starting clutch is engaged in a state in which the differential rotational speed is large when the vehicle starts. As a result, a heat generation amount of the starting clutch becomes larger at the time of engagement, so that there is a problem that deterioration in starting clutch and lowering of durability due to the deterioration are promoted.

There is a need for a control device of a vehicle capable of inhibiting deterioration in starting clutch when starting control to start the vehicle after increasing an engine speed before starting is performed.

SUMMARY OF THE INVENTION

It is an object of the present invention to at least partially solve the problems in the conventional technology.

A control device according to one aspect of the present invention mounted on a vehicle provided with a power source and an automatic transmission including a plurality of engaging units including engaging elements frictionally engaging with each other, the automatic transmission allowing or blocking power transmission between the power source and a drive wheel of the vehicle by controlling engagement of the plurality of engaging units, includes: a controller configured to perform control to increase a rotational speed of the power source when a brake is stepped on and accelerator opening becomes a predetermined value or larger while the vehicle stops, and thereafter, when the brake is stepped off, engage the plurality of engaging units to transmit the power, and start the vehicle. The controller includes: a parameter obtaining unit configured to obtain a parameter indicating requested acceleration when the vehicle starts; and a slip control unit configured to perform slip control on at least one of the plurality of engaging units such that difference in rotational speed occurs between the frictionally engaging elements and set number of engaging units on which the slip control is performed according to a value of the obtained parameter when the vehicle starts.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart illustrating an example of control according to the embodiment;

FIG. 18 is a flowchart illustrating another example of the control according to the embodiment applied to the vehicle in FIG. 13.

DETAILED DESCRIPTION OF THE PREFERRED EMBODIMENTS

Figure 1A:
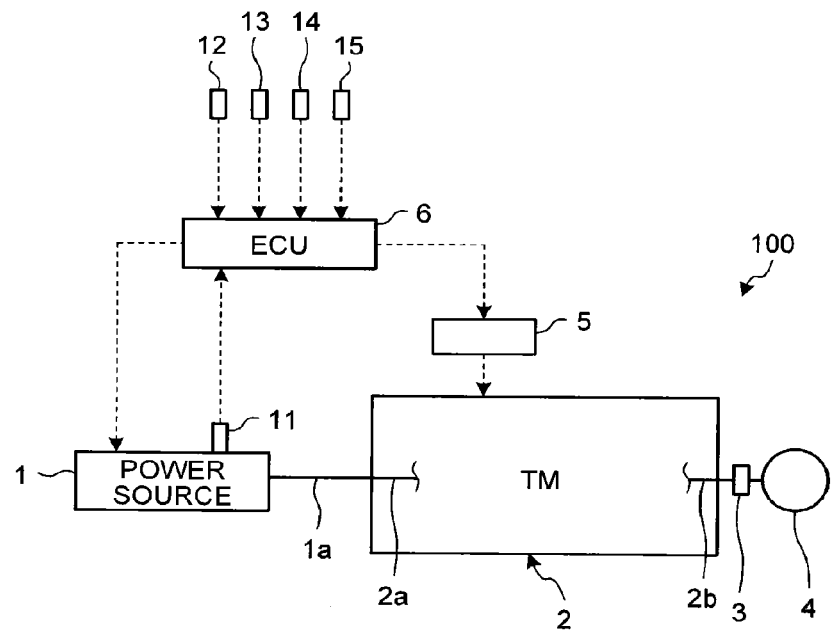
FIGS. 1A and 1B are views illustrating a schematic configuration of a vehicle equipped with a control device of the vehicle according to an embodiment and a skeleton diagram of an automatic transmission.

An embodiment of a control device of a vehicle according to the present invention is hereinafter described in detail with reference to the drawings. Meanwhile, the invention is not limited by the embodiment. In the drawings, the same reference sign is appropriately assigned to the same or corresponding components and the description thereof is not repeated.

Embodiment

Figure 1B:
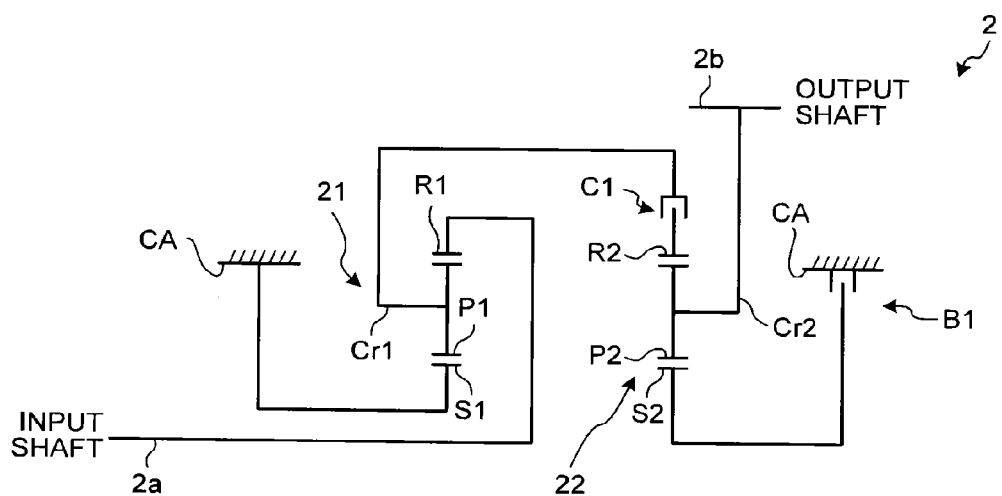

A control device of a vehicle which performs launch control as starting control is first described as an embodiment of the present invention. FIG. 1A is a view illustrating a schematic configuration of the vehicle equipped with the control device of the vehicle according to the embodiment and FIG. 1B is a skeleton diagram of an automatic transmission. As illustrated in FIG. 1A, a vehicle 100 is provided with a power source 1, an automatic transmission 2, a differential gear 3, a drive wheel 4, a hydraulic actuator 5, an electronic control unit (ECU) 6, a crank angle sensor 11, an accelerator opening sensor 12, a brake sensor 13, a vehicle speed sensor 14, and a launch control switch 15.

The power source 1 being a power source of the vehicle 100 is an engine in this embodiment; this converts combustion energy of fuel to rotational motion of an output shaft 1a to output. Meanwhile, the power source 1 is not limited to the engine but this may also be a motor, for example.

The automatic transmission 2 is configured such that a first planetary device 21, a second planetary device 22, and a plurality of engaging units are provided in a casing CA as illustrated in FIG. 1B. The engaging units having engaging elements frictionally engaging with each other include a first clutch C1 and a first brake B1. The automatic transmission 2 allows or blocks power transmission between the power source 1 and the drive wheel 4 of the vehicle 100 by controlling engagement of the engaging units. The automatic transmission 2 may also switch or set to a requested gear stage by engaging or disengaging the engaging units according to the requested gear stage between input and output. Meanwhile, the first clutch C1 and the first brake B1 being the engaging units engaging when the vehicle 100 starts are hereinafter appropriately referred to as starting clutches.

The first planetary device 21 being a single-pinion planetary gear mechanism includes a sun gear S1, a ring gear R1, a plurality of pinion gears P1, and a carrier Cr1 as a plurality of rotational elements capable of differentially rotating. The second planetary device 22 being a single-pinion planetary gear mechanism includes a sun gear S2, a ring gear R2, a plurality of pinion gears P2, and a carrier Cr2 as a plurality of rotational elements capable of differentially rotating. In the automatic transmission 2, the carrier Cr1 of the first planetary device 21 and the ring gear R2 of the second planetary device 22 are connected so as to be integrally rotatable with each other when the first clutch C1 is in an engaged state. Torque input from an output shaft 1a of the power source 1 to an input shaft 2a of the automatic transmission 2 is output from the carrier Cr2 of the second planetary device 22 to be transmitted to the drive wheel 4 through an output shaft 2b and the differential gear 3.

The first clutch C1 is provided with a first engaging unit capable of integrally rotating with the carrier Cr1 of the first planetary device 21 and a second engaging unit capable of integrally rotating with the ring gear R2 of the second planetary device 22. Specifically, the first clutch C1 is a frictional engaging device provided with a friction material on any one of the first and second engaging units and engaging operation and disengaging operation between the first and second engaging units is hydraulically controlled.

The first brake B1 is a hydraulically-driven frictional engaging device like the first clutch C1. The first brake B1 is provided with a first engaging unit capable of integrally rotating with the sun gear S2 of the second planetary device 22 and a second engaging unit fixed to the casing CA.

With reference to FIG. 1A again, the hydraulic actuator 5 operated by operating oil controls the engaging operation and the disengaging operation of the first clutch C1 and the first brake B1. Oil pressure for the hydraulic actuator 5 to operate is given by an oil pump not illustrated.

The crank angle sensor 11 is provided on a crankshaft of the power source 1 being the engine for detecting a crank angle used for calculating a power source rotational speed (engine speed). The accelerator opening sensor 12 detects accelerator opening according to a step amount of an accelerator pedal by a driver and whether the accelerator is stepped on or off. The brake sensor 13 detects whether a brake is stepped on or off according to a step amount of the brake pedal by the driver. The vehicle speed sensor 14 detects a vehicle speed of the vehicle 100. The launch control switch 15 is a switch for the driver to request to perform or not the launch control when the vehicle 100 starts or to set acceleration with which the vehicle starts (that is to say, a level of starting acceleration performance). When the launch control switch 15 is turned on, the driver requests the launch control, and when the launch control switch 15 is turned off, the driver does not request the launch control. The crank angle sensor 11, the accelerator opening sensor 12, the brake sensor 13, the vehicle speed sensor 14, and the launch control switch 15 are electrically connected to the ECU 6 for outputting a detection result or a set result to the ECU 6.

The ECU 6 as the control device of the vehicle 100 physically is an electronic circuit mainly formed of a well-known microcomputer including a central processing unit (CPU), a random access memory (RAM), a read only memory (ROM), and an interface such as input and output. Functions of respective units of the ECU 6 are realized by loading an application program held in the ROM on the RAM and executing the same by the CPU, thereby allowing a control target to operate under control of the CPU, and by reading/writing data from/to the RAM and ROM. Meanwhile, the ECU 6 may also be formed of a plurality of ECUs which individually controls the power source 1, the automatic transmission 2 and the like. In this case, the ECUs are configured to be able to communicate with each other; they may transmit/receive various instructions and the detection results of the various sensors.

The ECU 6 controls a fuel injection amount and injection timing by an injector, ignition timing by an ignition plug and the like on the power source 1 being the engine. The ECU 6 outputs a control signal to the hydraulic actuator 5 with reference to a shift map and a shift diagram stored in the ECU 6 in advance based on the detection results of the vehicle speed and the accelerator opening and the like. The hydraulic actuator 5 controls the automatic transmission 2 based on the control signal. According to this, shift operation of the automatic transmission 2 is performed.

The ECU 6 is further provided with a parameter obtaining unit as a parameter obtaining unit and a slip control unit as a slip control unit which perform the launch control to be described later on the power source 1 and the automatic transmission 2 based on the detection result or the set result from the accelerator opening sensor 12 or the launch control switch 15, respectively.

An example of the control according to this embodiment is hereinafter specifically described with reference to a flow chart illustrated in FIG. 2, a time chart illustrated in FIG. 3, and a collinear diagram illustrated in FIG. 4. Meanwhile, a control routine illustrated in FIG. 2 is repeatedly executed for each control cycle of few ms to tens of ms, for example, while the vehicle 100 stops after an ignition switch of the vehicle 100 is turned on.

Figure 3:
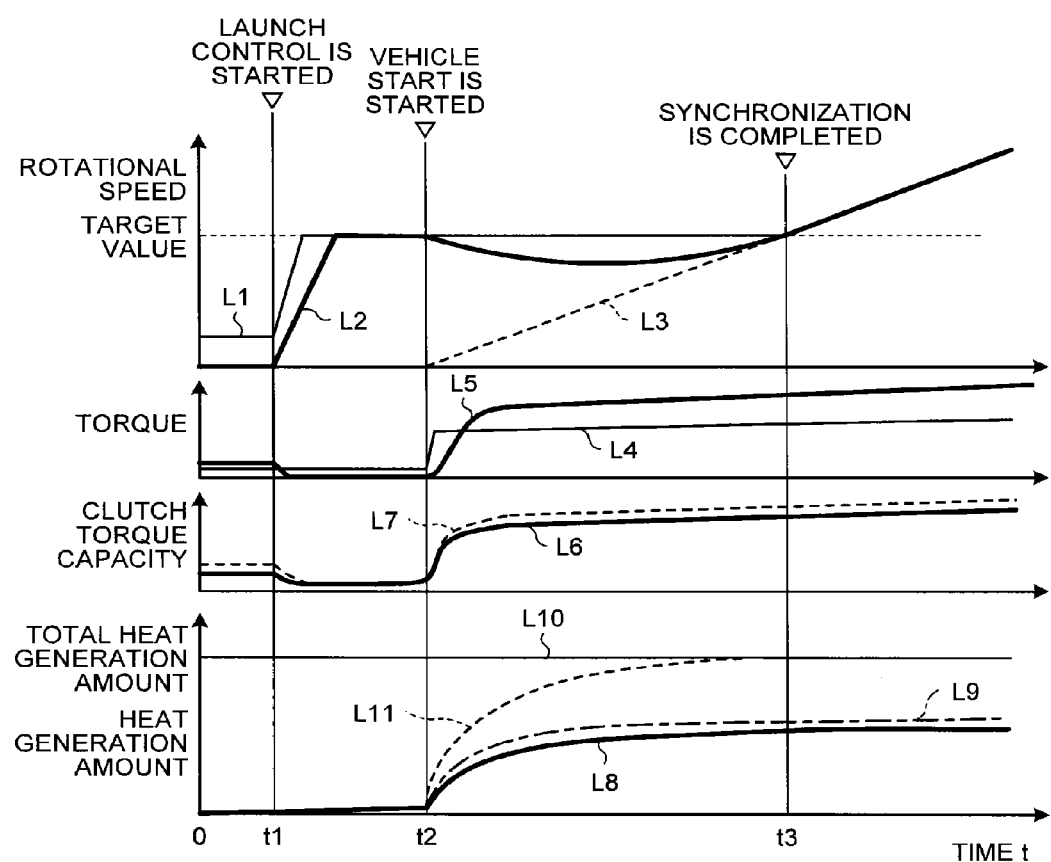
FIG. 3 is a time chart illustrating an example of the control according to the embodiment.

In FIG. 3, line L1 indicates the power source rotational speed of the power source 1, line L2 indicates an input shaft rotational speed of the input shaft 2a of the automatic transmission 2, and line L3 indicates the vehicle speed converted from the rotational speed of the input shaft 2a. Line L4 indicates power source torque of the power source 1 and line L5 indicates drive torque transmitted to the drive wheel 4. Lines L6 and L7 indicate clutch torque capacities of the first clutch C1 and the first brake B1, respectively. Lines L8 and L9 indicate heat generation amounts of the first clutch C1 and the first brake B1, respectively. Meanwhile, the heat generation amounts of the first clutch C1 and the first brake B1 may be obtained by temporal integration of a product of a differential rotational speed of the engaging elements frictionally engaging with each other and the clutch torque when slip control is performed on each starting clutch as described later in detail. Meanwhile, lines L10 and L11 are described later.

First, at time t=0 in FIG. 3, the ECU 6 executes step S101. That is to say, at step S101, the ECU 6 determines whether the launch control is in preparation. The ECU 6 determines that the launch control is in preparation when the launch control switch is turned on, the accelerator opening is not smaller than a predetermined value, and the brake is stepped on. When it is determined that the launch control is in preparation (Yes at step S101), the procedure shifts to step S102. When determining that the launch control is not in preparation (No at step S101), the ECU 6 finishes the process to return.

At time t=t1 in FIG. 3, the ECU 6 executes step S102. That is to say, at step S102, the parameter obtaining unit of the ECU 6 obtains the accelerator opening input from the accelerator opening sensor 12 and the set level input from the launch control switch 15 as parameters indicating the requested acceleration for the vehicle by the driver when the vehicle starts. The slip control unit of the ECU 6 sets the number of starting clutches on which the slip control should be performed to two (that is to say, first clutch C1 and first brake B1) according to a value of the parameter. Meanwhile, a relationship between the value of the parameter and the number of starting clutches on which the slip control should be performed is stored in the ECU 6 as a control map created from a vehicle evaluation result in advance and the like. The slip control unit of the ECU 6 starts performing the slip control in which difference in rotational speed occurs between the engaging elements frictionally engaging with each other on the first clutch C1 and the first brake B1. With this, the ECU 6 starts control to increase the power source rotational speed of the power source 1 to a predetermined target value. According to this, the power source rotational speed (line L1) increases from time t1 and the input shaft rotational speed also increases with this. Meanwhile, as for the target value of the power source rotational speed, a value for realizing desired starting acceleration performance estimated from the evaluation result in advance and the like is preferably stored in the ECU 6 as a control map. The ECU 6 more preferably corrects the target value of the power source rotational speed by gradient information and μ information of a road surface obtained from the sensors mounted on the vehicle 100; because a slip of a wheel when the vehicle starts may be avoided or inhibited. In this case, when a gradient of the road surface is sharp, the target value is corrected to be higher or when μ is low, the target value is corrected to be lower, for example. The target value of the power source rotational speed may also be directly input by the driver using the launch control switch 15. The input target value is obtained as the parameter indicating the requested acceleration by the driver when the vehicle starts. Thereafter, the procedure shifts to step S103.

At step S103, the ECU 6 determines whether the launch control switch is turned on and the accelerator is stepped on. When it is determined that the launch control is turned on and the accelerator is stepped on (Yes at step S103), the procedure shifts to step S104. Meanwhile, a case in which the launch control switch is turned on and the accelerator is stepped on corresponds to a case in which the driver has an intention to start the vehicle by the launch control.

At step S104, the ECU 6 determines whether the brake is stepped off. When the brake is not stepped off (No at step S104), the procedure returns to step S103, and when the brake is stepped off (Yes at step S104), the procedure shifts to step S105.

At time t=t2 in FIG. 3, the ECU 6 executes step S105. That is to say, at step S105, the ECU 6 starts increasing the power source torque in FIG. 3 and starts engaging the first clutch C1 and the first brake B1 being the starting clutches, then shifts to step S106. According to this, the power source torque (line L4) and the drive torque (line L5) increase as illustrated in FIG. 3 and the vehicle 100 starts starting by the launch control, so that the vehicle speed (line L3) increases. The clutch torque capacities (lines L6 and L7) and the heat generation amounts (lines L8 and L9) gradually increase by the engagement of the first clutch C1 and the first brake B1, and thereafter approach steady values. The clutch torque capacities of the first clutch C1 and the first brake B1 at the time of engagement are set based on a relationship between the drive torque which should be transmitted to the drive wheel 4 for realizing the desired starting acceleration performance and a gear ratio of a first-speed gear stage being a gear stage of the automatic transmission 2 when the vehicle starts. As for this relationship, it is preferable to create a control map from the evaluation result in advance and the like to store in the ECU 6. It is possible to inhibit a shock due to change in differential rotational speed of the starting clutch by engaging such that the differential rotational speed of each starting clutch substantially monotonously decreases at the time of engagement.

At step S106, the ECU 6 determines whether the engagement of the first clutch C1 and the first brake B1 being the starting clutches is completed. When the engagement is not completed (No at step S106), the ECU 6 repeats step S106, and when the engagement is completed (Yes at step S106), the ECU 6 finishes the process to return. Meanwhile, when the engagement is completed, synchronization of the power source 1 with the automatic transmission 2 is completed (corresponding to time t=t3 in FIG. 3) and the rotational speeds indicated by lines L1 and L2 become the same.

On the other hand, when the launch control switch is turned off or the accelerator is stepped off at step S103 (No at step S103), the ECU 6 shifts to step S107 to engage the first clutch C1 and the first brake B1 being the starting clutched. This case corresponds to a case in which the driver no longer has the intention to perform the launch control; the vehicle 100 starts without the launch control by the engagement of the first clutch C1 and the first brake.

Figure 4:
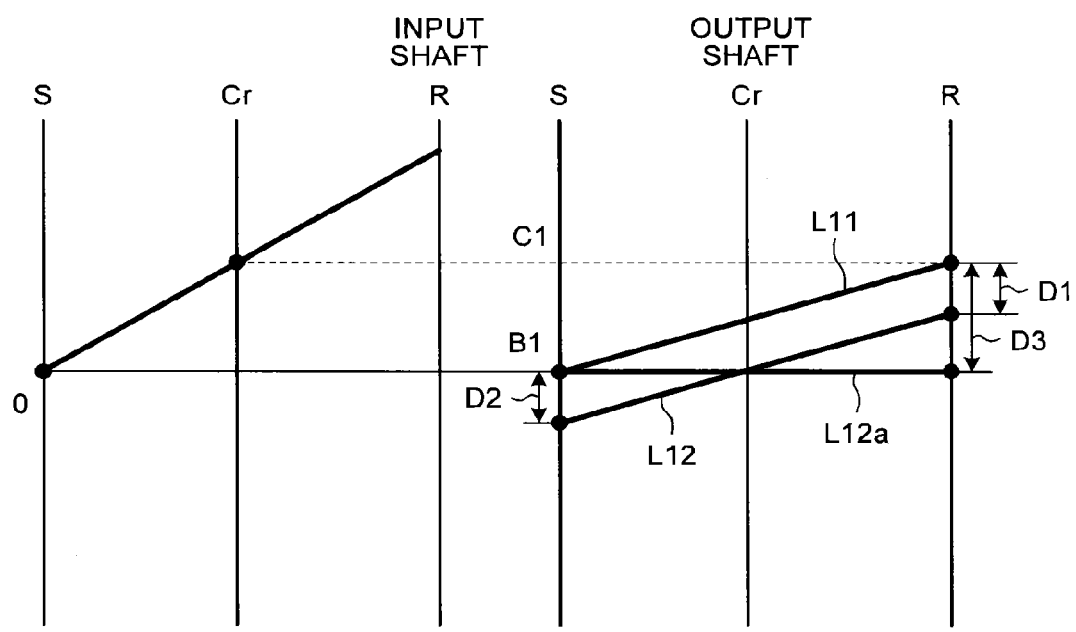
FIG. 4 is a collinear diagram when the vehicle starts according to an example of the control according to the embodiment.

Herein, in the collinear diagram in FIG. 4, line L11 indicates a state in which the first clutch C1 and the first brake B1 being the starting clutches engage after the vehicle starts, and line L12 indicates a state after the launch control is started until the vehicle starts. As illustrated in FIG. 4, the slip control is performed on the first clutch C1 and the first brake B1 after the launch control is started until the vehicle starts, and there is difference in rotational speed of difference D1 and difference D2 in the first clutch C1 and the first brake B1, respectively, as compared to the engaged state. According to this, each of the first clutch C1 and the first brake B1 generates heat at the time of engagement thereafter; however, the heat generation amount is distributed to the respective starting clutches by the slip control of the two starting clutches, so that the heat generation amount in each starting clutch becomes smaller than that when the slip control is performed on one starting clutch.

For example, a case in which control to perform the slip control only on the first clutch C1 and keep the first brake B1 engaged when the vehicle starts by the launch control in the automatic transmission 2 is considered as comparison. A state of this case is indicated by line L12a in FIG. 4. In this case, difference in rotational speed of difference D3 occurs in the first clutch C1 as compared to the engaged state. As a result, the heat generation amount of the first clutch C1 by the engagement changes with time so as to approach line L10 as indicated by line L11 in FIG. 3, so that the heat generation amount becomes larger than that in the case in which the slip control is performed on two starting clutches. Herein, line L10 indicates a total heat generation amount supposed to be generated in the starting clutch by the slip control when the launch control is performed.

In this manner, according to this embodiment, the heat generation amount in each starting clutch becomes smaller when the launch control is performed, so that deterioration in starting clutch may be inhibited.

Meanwhile, it is preferable to store the heat generation amount in the starting clutch when the launch control is performed estimated from the evaluation result in advance and the like from the target value of the power source rotational speed for realizing the desired starting acceleration performance and the like in the ECU 6 and set the difference in rotational speed (differential rotational speed) when the slip control is performed on a plurality of starting clutches based on this. At that time, it is possible to inhibit more certainly the deterioration in each starting clutch also when there is variation in an allowable heat generation amount and slip control accuracy in each starting clutch by setting the differential rotational speed such that a safety factor for the allowable heat generation amount is in a comparable level in all the starting clutches.

Herein, although the number of starting clutches on which the slip control is performed is set to two in an example of the control described above, when a plurality of starting clutches is simultaneously controlled in this manner, variation in control is accumulated when torque control accuracy of each starting clutch is low, and the shock is likely to occur when the vehicle starts. On the other hand, when the requested acceleration by the driver when the vehicle starts is low, or when the allowable heat generation amount of the starting clutch is sufficiently larger than a supposed heat generation amount, the occurrence of shock described above is avoided or the shock is inhibited by control to decrease the number of starting clutches on which the slip control is performed.

Figure 5:
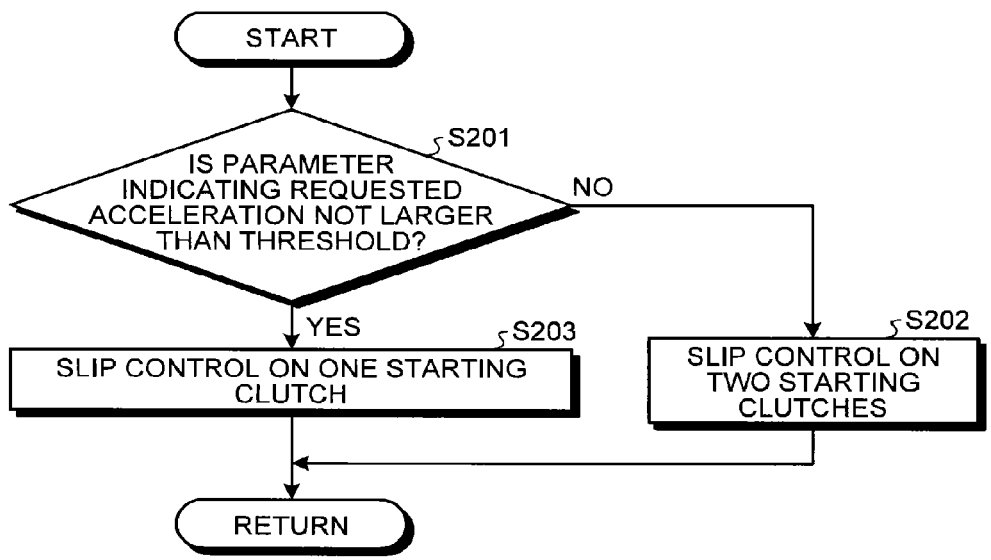
FIG. 5 is a flowchart illustrating an example of control to set the number of starting clutches on which slip control is performed in the control according to the embodiment.

FIG. 5 is a flowchart illustrating an example of the control to set the number of starting clutches on which the slip control is performed in the control according to the embodiment. The control illustrated in FIG. 5 is executed when the slip control unit of the ECU 6 sets the number of starting clutches on which the slip control should be performed. First, at step S201, the slip control unit determines whether the parameter (accelerator opening and level set by the launch control switch 15) indicating the requested acceleration by the driver when the vehicle starts is not larger than a predetermined threshold. When the parameter is larger than the threshold (No at step S201), this determines to perform the slip control on two starting clutches (that is to say, first clutch C1 and first brake B1) at step S202 and finishes the process to return. On the other hand, when the parameter is not larger than the threshold (Yes at step S201), this determines to perform the slip control on one starting clutch at step S203 and finishes the process to return.

In this manner, the slip control unit of the ECU 6 sets the number of starting clutches on which the slip control is performed to be larger as the requested acceleration indicated by the parameter is higher, so that it is possible that the heat generation by the slip control which increases as the requested acceleration is higher is shared by more engaging units. On the other hand, the slip control unit of the ECU 6 sets the number of starting clutches on which the slip control is performed to be smaller as the requested acceleration indicated by the parameter is lower, so that it is possible to avoid occurrence of the shock when the vehicle starts or inhibit the shock while inhibiting the deterioration in starting clutch. Especially, when the requested acceleration is low and the acceleration when the vehicle starts is low, the shock is likely to be felt, so that it is more effective to set in the above-described manner.

The number of starting clutches on which the slip control is performed may be set in the following manner. First, supposing that the slip control is performed on one starting clutch (first starting clutch), the heat generation amount when the slip control is performed only on the first starting clutch is calculated based on the parameter indicating the requested acceleration. When the calculated heat generation amount is not larger than the allowable heat generation amount of the first starting clutch (or a threshold of the heat generation amount set in consideration of the safety factor for the allowable heat generation amount), the starting clutch on which the slip control is performed is set to the first starting clutch (the number of starting clutches on which the slip control is performed is set to one). When the calculated heat generation amount is larger than the allowable heat generation amount (or threshold) of the first starting clutch, supposing that the slip control is performed on another starting clutch (second starting clutch) in addition to the first starting clutch, the heat generation amount in each starting clutch when the slip control is performed on the first and second starting clutches based on the parameter indicating the requested acceleration. When each calculated heat generation amount is not larger than the allowable heat generation amount (or threshold) of each starting clutch, the starting clutches on which the slip control is performed are set to the first and second starting clutches (the number of starting clutches on which the slip control is performed is set to two). When each calculated heat generation amount is larger than the allowable heat generation amount (or threshold) of each starting clutch, the starting clutch on which the slip control is performed is further added and the similar calculation is performed. According to this, it is possible to set the number of starting clutches on which the slip control is performed such that the heat generation amount generated in the starting clutch on which the slip control is performed does not become larger than the allowable heat generation amount (or threshold) of each starting clutch. According to this, it is possible to set the number of starting clutches on which the slip control is performed to be smaller as the allowable heat generation amount of the starting clutch is larger.

It is also possible to use the calculated heat generation amount of the starting clutch as the parameter indicating the requested acceleration by the driver when the vehicle starts in the control illustrated in FIG. 5.

Another Configuration Example 1 of Automatic Transmission

Although it is described based on the vehicle 100 equipped with the automatic transmission 2 with the limited number of gear stages for simplifying the description, it is also possible to mount an automatic transmission with more gear stages on the vehicle 100.

Figure 6:
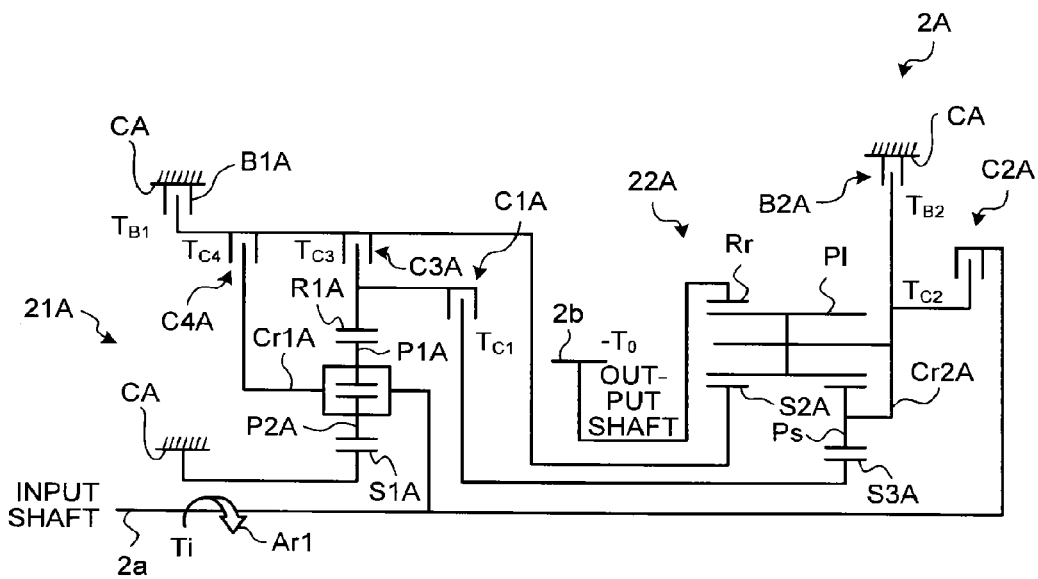
FIG. 6 is a skeleton diagram of another configuration example 1 of the automatic transmission applicable to the vehicle in FIG. 1A.

FIG. 6 is a skeleton diagram of another configuration example 1 of the automatic transmission applicable to the vehicle in FIG. 1A. As illustrated in FIG. 6, an automatic transmission 2A is a forward eight-speed automatic transmission which may be mounted on the vehicle 100 in place of the automatic transmission 2.

The automatic transmission 2A is provided with an input shaft 2a and an output shaft 2b. The automatic transmission 2A is configured such that a first planetary device 21A, a second planetary device 22A, and a plurality of engaging units are provided in a casing CA. A plurality of engaging units includes a first clutch CIA, a second clutch C2A, a third clutch C3A, a fourth clutch C4A, a first brake B1A, and a second brake B2A. The automatic transmission 2A may switch or set to a requested gear stage by engaging or disengaging the engaging units according to the requested gear stage between input and output. Meanwhile, the first clutch C1A and the second brake B2A being the engaging units which engage when the vehicle 100 starts are hereinafter appropriately referred to as starting clutches.

The first planetary device 21A being a double-pinion planetary gear mechanism includes a sun gear S1A, a ring gear R1A, a plurality of first pinion gears P1A, a plurality of second pinion gears P2A, and a carrier Cr1A as a plurality of rotational elements capable of differentially rotating. The second planetary device 22A being a Ravigneaux planetary gear mechanism includes a first sun gear S2A, a second sun gear S3A, a ring gear Rr, a plurality of long pinion gears P1, a plurality of short pinion gears Ps, and a carrier Cr2A as a plurality of rotational elements capable of differentially rotating. The carrier Cr1A of the first planetary device 21A and the first sun gear S2A of the second planetary device 22A are connected so as to integrally rotatable with each other. Torque input to the automatic transmission 2A is output from the ring gear Rr of the second planetary device 22A to be transmitted to the drive wheel 4 through the output shaft 2b and the differential gear 3.

The first clutch C1A is provided with a first engaging unit integrally rotatable with the second sun gear S3A of the second planetary device 22A and a second engaging unit integrally rotatable with the ring gear R1A of the first planetary device 21A and engaging operation and disengaging operation between the first and second engaging units are hydraulically controlled. The second clutch C2A and the third clutch C3A are hydraulically-driven frictional engaging devices like the first clutch CIA. The second clutch C2A is provided with a first engaging unit integrally rotatable with the carrier Cr2A of the second planetary device 22A and a second engaging unit integrally rotatable with the carrier Cr1A of the first planetary device 21A. The third clutch C3A is provided with a first engaging unit capable of integrally rotating with the ring gear R1A of the first planetary device 21A and the second engaging unit of the first clutch C1A and a second engaging unit capable of integrally rotating with the second sun gear S3A of the second planetary device 22A. The fourth clutch C4A is provided with a first engaging unit capable of integrally rotating with the carrier Cr1A of the first planetary device 21A and a second engaging unit capable of integrally rotating with the first sun gear S2A of the second planetary device 22A and the second engaging unit of the third clutch C3A.

The first brake B1A and the second brake B2A are hydraulically-driven frictional engaging devices like the first clutch CIA and the like. The first brake B1A is provided with a first engaging unit capable of integrally rotating with the second sun gear S3A of the second planetary device 22A and a second engaging unit fixed to the casing CA. Therefore, the first engaging unit may also integrally rotate with the second engaging units of the third clutch C3A and the fourth clutch C4A. The second brake B2A is provided with a first engaging unit capable of integrally rotating with the carrier Cr2A of the second planetary device 22A and a second engaging unit fixed to the casing CA.

Figures 7A, 7B:
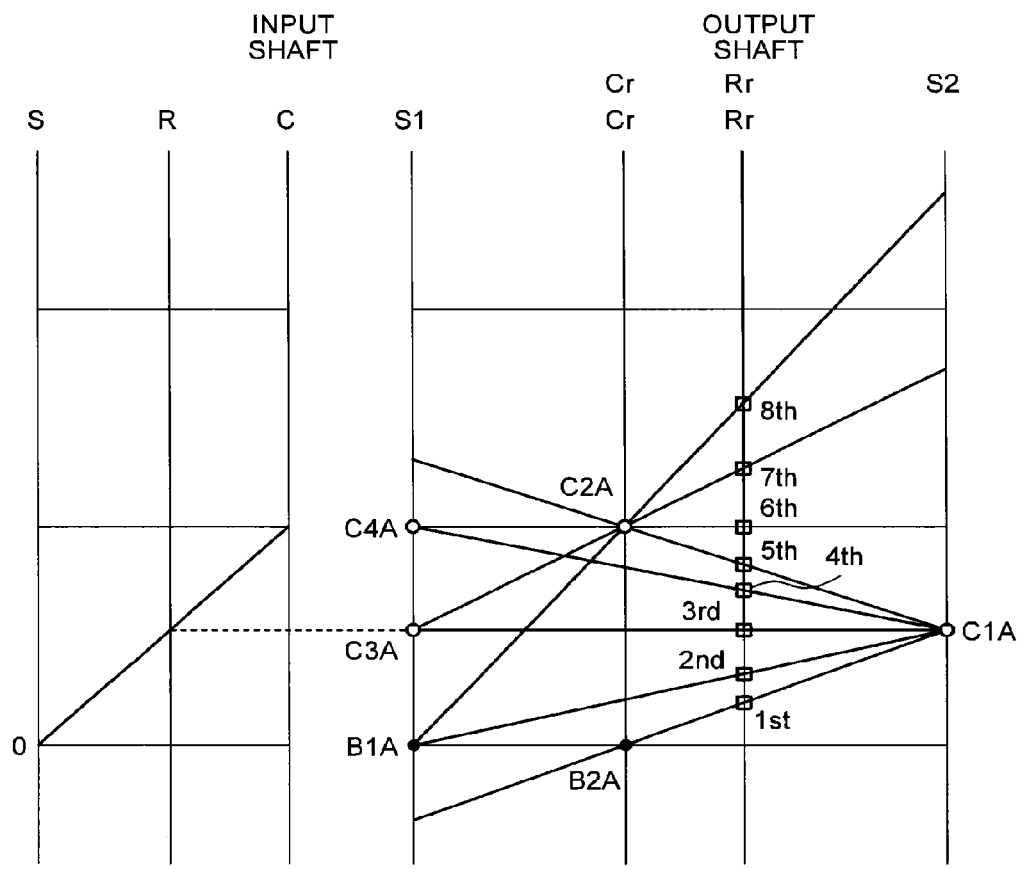
FIGS. 7A and 7B are a collinear diagram and an operation engagement table for each shift range of the automatic transmission in FIG. 6.

FIG. 7A is a collinear diagram (speed diagram) for each shift range of the automatic transmission 2A, and FIG. 7B is an operation engagement table for each shift range of the first clutch C1A, the second clutch C2A, the third clutch C3A, the fourth clutch C4A, the first brake B1A, and the second brake B2A. In the operation engagement table, a circle mark indicates an engaged state and a blank field indicates a disengaged state. "1st", "2nd", "3rd", "4th", "5th", "6th", "7th", and "8th" indicate first to eighth-speed gear stages, respectively, in a forward range D. For example, in a case of the first-speed gear stage, the first clutch C1A and the second brake B2A are engaged.

When an example of the control according to the embodiment illustrated in FIGS. 2, 3 and the like is applied to the automatic transmission 2A, in the control, the launch control may be executed by the slip control performed on the first clutch CIA and the second brake B2A of the automatic transmission 2A as on the first clutch C1 and the first brake B1 of the automatic transmission 2, as is clear from comparison between FIG. 4 and a line indicating "1st" in FIG. 7A. Therefore, also when the automatic transmission 2A is mounted, a flow chart and a time chart for the control in which the launch control is performed are similar to the flow chart and the time chart illustrated in FIGS. 2 and 3, and the flowchart of the control illustrated in FIG. 5 may also be applied.

Herein, when the automatic transmission 2A is mounted, when the slip control is performed only on one starting clutch, the slip control is preferably performed on the second brake B2A as compared to the first clutch C1A. A reason for this is described below.

When the ECU 6 requests up-shift during the slip control of the second brake B2A when the vehicle starts and it shifts to the second-speed gear stage being a next highest gear stage, as is understood from FIG. 7B, the second brake B2A is disengaged and the first brake B1A is engaged with the first clutch C1A remaining engaged, and according to this, the second-speed gear stage is established. Therefore, it is possible to rapidly disengage the second brake B2A when shifting to the second-speed gear stage by performing the slip control on the second brake B2A, so that the gear shift may be performed with excellent responsiveness. That is to say, it is preferable to set the starting clutch on which the slip control is performed to the starting clutch disengaged when the highest gear stage next to the gear stage when the vehicle starts is established.

[Calculation of Heat Generation Amount]

Herein, a method of calculating a predicted value of a heat generation amount in the starting clutch is described. The predicted value of the heat generation amount may be calculated by using a predetermined physical model stored in advance in the ECU 6. Herein, the physical model is described by using the configuration of the automatic transmission 2A illustrated in FIG. 6.

As illustrated in FIG. 6, torque in the input shaft 2a, the first clutch C1A, the second clutch C2A, the third clutch C3A, the fourth clutch C4A, the first brake B1A, the second brake B2A, and the output shaft 2b is represented as $T_1$, $T_{C1}$, $T_{C2}$, $T_{C3}$, $T_{C4}$, $T_{B1}$, $T_{B2}$, and $T_o$, respectively. Meanwhile, the torque in a direction of normal rotation (arrow Ar1) of the input shaft 2a is with plus sign. Regarding the first clutch C1A to the second brake B2A, the torque of the engaging unit with plus sign out of the engaged first and second engaging units is illustrated, and the torque of the engaging unit which engages with the same is the same torque as the illustrated torque with minus sign.

As the physical model, angular speeds of the input shaft 2a, the ring gear R1A, the first sun gear S2A, the second sun gear S3A, the carrier Cr2A, and the output shaft 2b are set to $\omega_i$, $\omega_{R1}$, $\omega_{S2}$, $\omega_{S3}$, $\omega_{RC4}$, and $\omega_o$, respectively. A motion equation in following equation (1) using a matrix A having an inertia value of each rotational element and the number of gears of each gear as parameters is used.

$$\begin{bmatrix} \dot{\omega}_i \\ \dot{\omega}_{R1} \\ \dot{\omega}_{S2} \\ \dot{\omega}_{S3} \\ \dot{\omega}_{RCA} \\ \dot{\omega}_0 \end{bmatrix} = A \begin{bmatrix} T_i \\ T_{C1} \\ T_{C2} \\ T_{C3} \\ T_{C4} \\ T_{B1} \\ T_{B2} \\ T_0 \end{bmatrix} \quad (1)$$

Next, the equation is deformed to eliminate $T_0$ from equation (1) and equation (2) using a matrix B having the inertia value of each rotational element and the number of gears of each gear as the parameters is obtained.

$$\begin{bmatrix} \dot{\omega}_i \\ \dot{\omega}_{R1} \\ \dot{\omega}_{S2} \\ \dot{\omega}_{S3} \\ \dot{\omega}_{RCA} \end{bmatrix} = B \begin{bmatrix} T_i \\ T_{C1} \\ T_{C2} \\ T_{C3} \\ T_{C4} \\ T_{B1} \\ T_{B2} \\ \dot{\omega}_0 \end{bmatrix} \quad (2)$$

Meanwhile, temporal differentiation of $\omega_o$ in equation (2) may be calculated by a detection value of a vehicle speed sensor 14. $T_i$ is calculated from a product of a transmission function from the power source 1 to the input shaft 2a of the automatic transmission 2A and an estimate value. A differential rotational speed in the first clutch C1A, for example, may be represented by equation (3) by using equation (2).

$$\int (\dot{\omega}_{R1} - \dot{\omega}_{S3}) dt \quad (3)$$

It is possible to calculate the predicted value of the heat generation amount by temporally integrating the product of the differential rotational speed of equation (3) and the torque.

Meanwhile, as for the above-described differential rotational speed, if the vehicle is provided with a rotational speed sensor which measures a rotational speed of the engaging unit of the starting clutch, it is also possible to calculate the differential rotational speed from a measured rotational speed to use for calculating the predicted value of the heat generation amount.

If the vehicle is provided with an oil pressure sensor which measures oil pressure in the starting clutch, the heat generation amount in the starting clutch may be calculated by using an oil pressure value and a value of a frictional coefficient of a friction material in the starting clutch.

Another Configuration Example 2 of Automatic Transmission

Figures 8, 9:
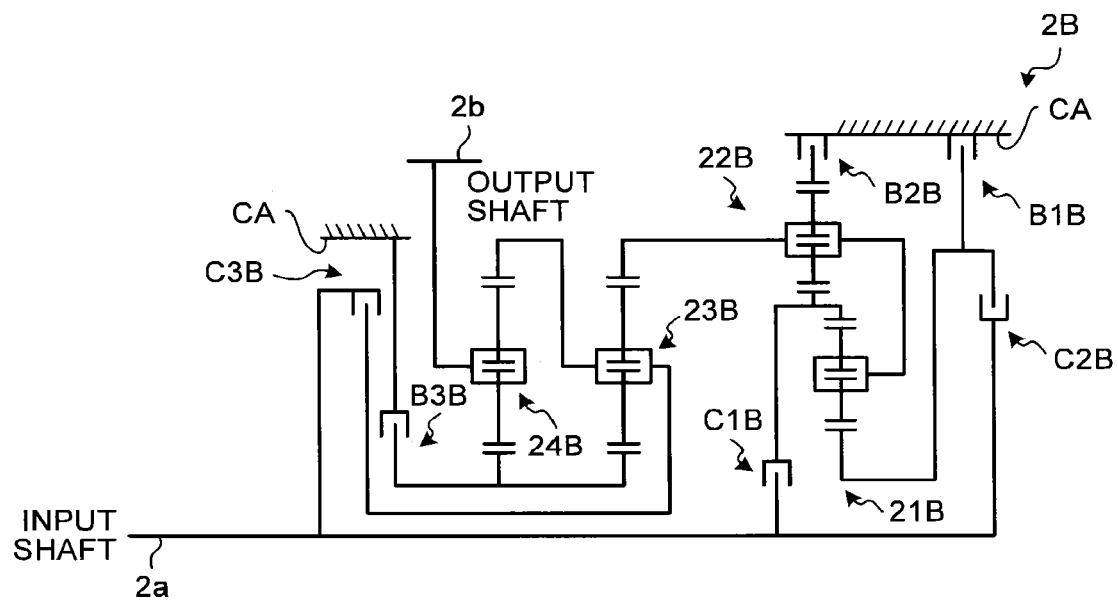
FIG. 8 is a skeleton diagram of another configuration example 2 of the automatic transmission applicable to the vehicle in FIG. 1A.
FIG. 9 is an operation engagement table for each shift range of the automatic transmission in FIG. 8.

FIG. 8 is a skeleton diagram of another configuration example 2 of the automatic transmission applicable to the vehicle in FIG. 1A. As illustrated in FIG. 8, an automatic transmission 2B is a forward nine-speed automatic transmission which may be mounted on the vehicle 100 in place of the automatic transmission 2.

The automatic transmission 2B is provided with an input shaft 2a and an output shaft 2b. The automatic transmission 2B is configured such that a first planetary device 21B, a second planetary device 22B, a third planetary device 23B, a fourth planetary device 24B, and a plurality of engaging units are provided in a casing CA. A plurality of engaging units includes a first clutch C1B, a second clutch C2B, a third clutch C3B, a first brake B1B, a second brake B2B, and a third brake B3B. The automatic transmission 2B may switch or set to a requested gear stage by engaging or disengaging the engaging units according to the requested gear stage between input and output. Meanwhile, the first clutch C1B, the second brake B2B, and the third brake B3B being the engaging units which engage when the vehicle 100 starts are hereinafter appropriately referred to as starting clutches.

Each of the first planetary device 21B, the second planetary device 22B, the third planetary device 23B, and the fourth planetary device 24B being a double-pinion planetary gear mechanism includes a sun gear, a ring gear, a plurality of first pinion gears, a plurality of second pinion gears, and a carrier as a plurality of rotational elements capable of differentially rotating. Torque input to the automatic transmission 2B is output from the carrier of the fourth planetary gear device 24B to be transmitted to the drive wheel 4 through the output shaft 2b and the differential gear 3.

FIG. 9 illustrates an operation engagement table for each shift range of the first clutch C1B, the second clutch C2B, the third clutch C3B, the first brake B1B, the second brake B2B, and the third brake B3B. In the operation engagement table, a circle mark indicates an engaged state and a blank field indicates a disengaged state. For example, the first clutch C1B, the second brake B2B, and the third brake B3B are engaged in a case of a first-speed gear stage.

Figure 10:
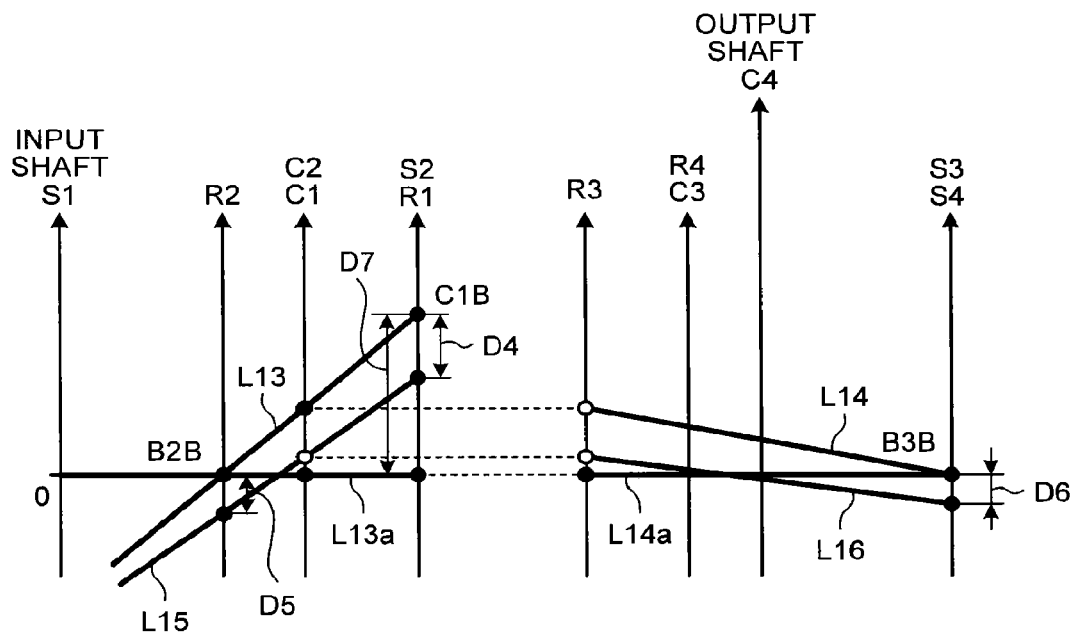
FIG. 10 is a collinear diagram when the vehicle starts of the automatic transmission in FIG. 9.

FIG. 10 is a collinear diagram when the vehicle starts of the automatic transmission in FIG. 9. When an example of the control by the embodiment illustrated in FIGS. 2, 3 and the like is applied to the automatic transmission 2B, in the control, the launch control may be executed by the slip control performed on each of three starting clutches of the automatic transmission 2B: the first clutch C1B, the second brake B2B, and the third brake B3B. Therefore, when the automatic transmission 2B is mounted also, a flow chart and a time chart for the control in which the launch control is performed are similar to the flow chart and the time chart illustrated in FIGS. 2 and 3. However, different from the case in FIGS. 2 and 3, the number of starting clutches on which the slip control is performed is three.

Specifically, in the collinear diagram in FIG. 10, lines L13 and L14 indicate a state in which the first clutch C1B, the second brake B2B, and the third brake B3B being the starting clutches engage after the vehicle starts, and lines L15 and L16 indicate a state after the launch control is started until the vehicle starts. The slip control is performed on the first clutch C1B, the second brake B2B, and the third brake B3B after the launch control is started until the vehicle starts, and there is difference in rotational speed of difference D4, difference D5, and difference D6 in the first clutch C1B, the second brake B2B, and the third brake B3B, respectively, as compared to the engaged state. According to this, although each of the first clutch C1B, the second brake B2B, and the third brake B3B generates heat, a heat generation amount is distributed to the respective starting clutches by the slip control of the three starting clutches, so that the heat generation amount in each starting clutch becomes smaller than that when the slip control is performed on one starting clutch.

For example, a case in which control to perform the slip control only on the first clutch C1B and engage the second brake B2B and the third brake B3B is performed when the vehicle starts by the launch control in the automatic transmission 2B is considered as comparison. A state of this case is indicated by lines L13a and L14a in FIG. 10. In this case, difference in rotational speed of difference D7 occurs in the first clutch C1B as compared to the engaged state. As a result, the heat generation amount in a single starting clutch becomes larger than that when the slip control is performed on the three starting clutches.

In this manner, the heat generation amount in each starting clutch becomes further smaller when the launch control is performed by the slip control of the three starting clutches of the automatic transmission 2B, so that deterioration in starting clutch may be further inhibited. It is possible to effectively inhibit the deterioration in starting clutch also when requested acceleration by a driver when the vehicle starts is higher.

When the automatic transmission 2B is mounted also, it is possible to perform the control similar to that illustrated in FIG. 5 to increase/decrease the number of starting clutches on which the slip control is performed according to a relationship between a parameter indicating the requested acceleration by the driver when the vehicle starts and a threshold. Meanwhile, It is preferable to perform the slip control on the second brake B2B when the slip control is performed only on one starting clutch as in the control illustrated in FIG. 5. It is possible to rapidly disengage the second brake B2B when gear shift to a second-speed gear stage is performed by performing the slip control on the second brake B2B, so that the gear shift may be performed with excellent responsiveness.

Another Configuration Example 1 of Vehicle

Figure 11:
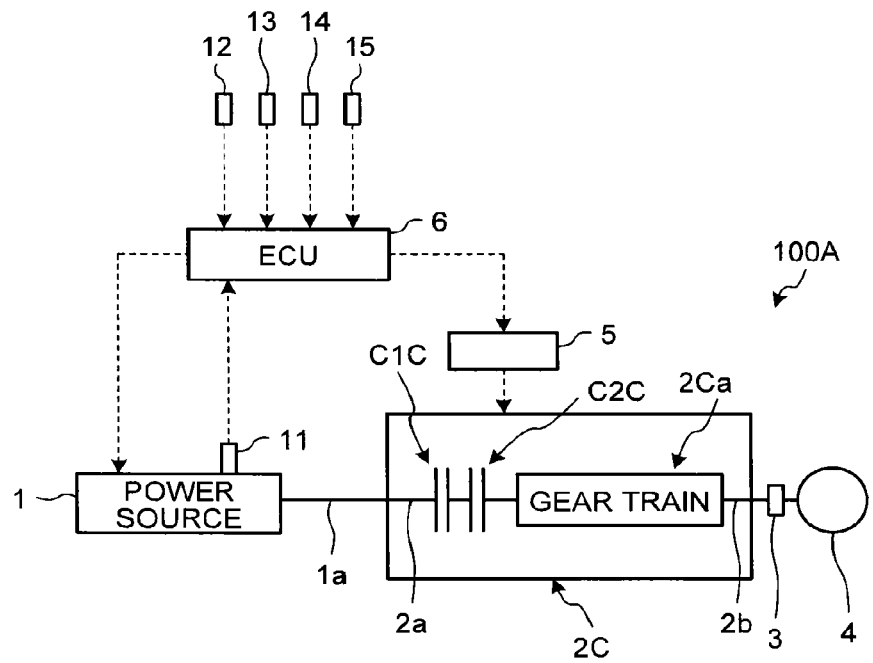
FIG. 11 is a view illustrating a schematic configuration of another vehicle equipped with the control device of the vehicle according to the embodiment.

FIG. 11 is a view illustrating a schematic configuration of another vehicle equipped with the control device of the vehicle according to the embodiment. A vehicle 100A illustrated in FIG. 11 has a configuration in which the automatic transmission 2 of the vehicle 100 illustrated in FIG. 1A is replaced with an automatic transmission 2C.

The automatic transmission 2C is provided with an input shaft 2a and an output shaft 2b. The automatic transmission 2C is configured such that a first clutch C1C, a second clutch C2C, and a gear train 2Ca are connected in series. The first clutch C1C and the second clutch C2C having engaging elements frictionally engaging with each other are engaging units engaging when the vehicle 100A starts; they are hereinafter appropriately referred to as starting clutches. The automatic transmission 2C allows or blocks power transmission between a power source 1 and a drive wheel 4 of the vehicle 100A by controlling engagement of the engaging units. The gear train 2Ca is formed of a plurality of gears which establishes gear stages in the automatic transmission 2C. The automatic transmission 2C may switch or set to a requested gear stage by engaging or disengaging the gears forming the gear train 2Ca according to the requested gear stage between input and output.

A hydraulic actuator 5 operated by operating oil controls engaging operation and disengaging operation of the first clutch C1C, the second clutch C2C, and the gear train 2Ca.

When an example of the control according to the embodiment illustrated in FIGS. 2, 3 and the like is applied to the automatic transmission 2C, in the control, the launch control may be executed by the slip control performed on the first clutch C1C and the second clutch C2C of the automatic transmission 2C. Therefore, also in the vehicle 100A, a flow chart and a time chart for the control in which the launch control is performed are similar to the flow chart and the time chart illustrated in FIGS. 2 and 3, and the flowchart of the control illustrated in FIG. 5 may also be applied.

Figure 12:
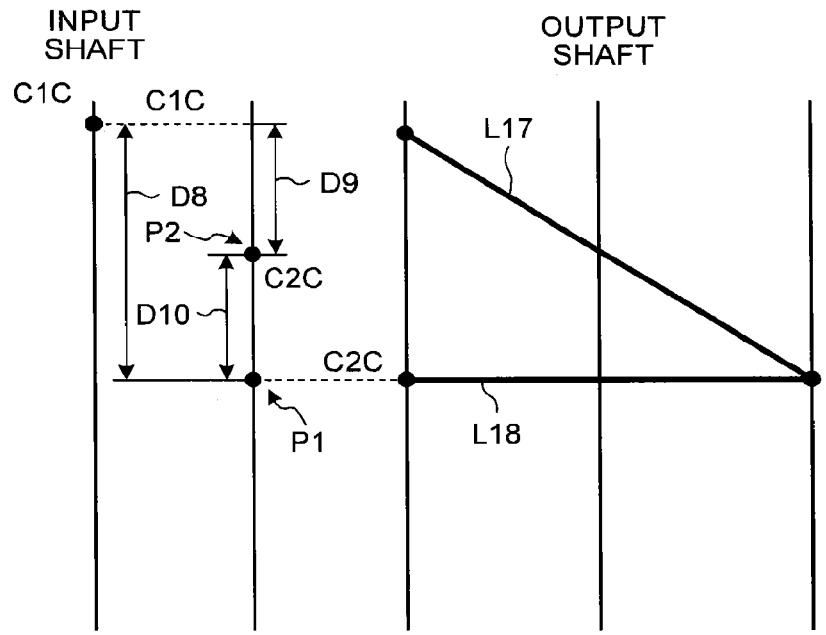
FIG. 12 is a collinear diagram when the vehicle starts of the automatic transmission in FIG. 11.

FIG. 12 is a collinear diagram when the vehicle starts of the automatic transmission 2C in FIG. 11. In the collinear diagram in FIG. 12, line L17 indicates a state in which the first clutch C1C and the second clutch C2C being the starting clutches engage after the vehicle starts, and line L18 indicates a state after the launch control is started until the vehicle starts.

For example, a case in which control to perform the slip control only on the first clutch C1C and engage the second clutch C2C when the vehicle starts by the launch control in the automatic transmission 2C is considered as comparison. In this case, since the second clutch C2C is engaged, this is indicated by a position P1. At that time, since the two starting clutches are connected in series, difference in rotational speed of difference D8 occurs in the first clutch C1C.

On the other hand, in this control, the slip control is performed on the first clutch C1C and the second clutch C2C after the launch control is started until the vehicle starts, so that the second clutch C2C is indicated by a position P2. As a result, difference in rotational speed of difference D9 and difference D10 occur in the first clutch C1C and the second clutch C2C, respectively, as compared to the engaged state. According to this, each of the first clutch C1C and the second clutch C2C generates heat; however, the heat generation amount is distributed to the respective starting clutches by the slip control of the two starting clutches, so that the heat generation amount in each starting clutch becomes smaller than that in a case in which the slip control is performed on one starting clutch.

In this manner, the heat generation amount in each starting clutch becomes smaller when the launch control is performed also in the vehicle 100A, so that deterioration in starting clutch may be inhibited.

Another Configuration Example 2 of Vehicle

Figure 13:
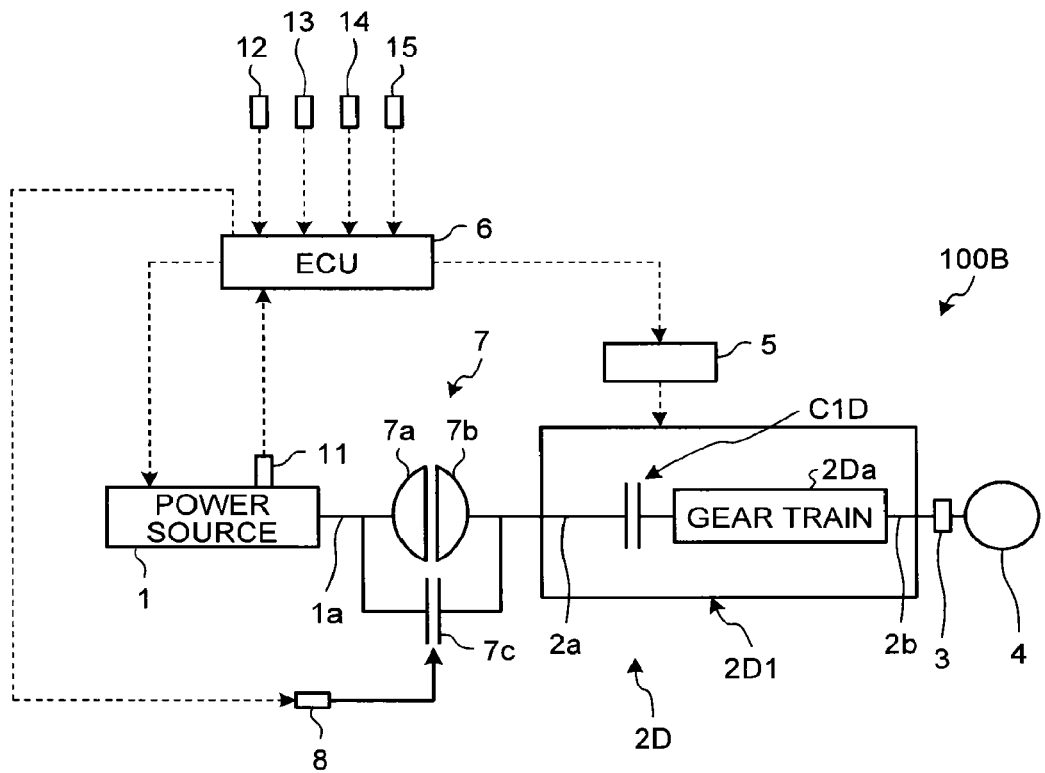
FIG. 13 is a view illustrating a schematic configuration of still another vehicle equipped with the control device of the vehicle according to the embodiment.

FIG. 13 is a view illustrating a schematic configuration of still another vehicle equipped with the control device of the vehicle according to the embodiment. A vehicle 100B illustrated in FIG. 13 has a configuration in which an automatic transmission 2 of the vehicle 100 illustrated in FIG. 1A is replaced with an automatic transmission 2D and a hydraulic actuator 8 is added.

The automatic transmission 2D is provided with an input shaft 2a and an output shaft 2b. The automatic transmission 2D is provided with a transmission main body 2D1 in which a first clutch C1D and a gear train 2Da are connected in series and a torque converter 7 arranged between a power source 1 and the transmission main body 2D1. The first clutch C1D having engaging elements frictionally engaging with each other is an engaging unit engaging when the vehicle 100B starts; this is hereinafter appropriately referred to as a starting clutch. The automatic transmission 2D allows or blocks power transmission between the power source 1 and a drive wheel 4 of the vehicle 100B by controlling engagement of the first clutch C1D. The gear train 2Da is formed of a plurality of gears which establishes gear stages in the automatic transmission 2D. The automatic transmission 2D may switch or set to a requested gear stage by engaging or disengaging the gears forming the gear train 2Da according to the requested gear stage between input and output.

A hydraulic actuator 5 operated by operating oil controls engaging operation and disengaging operation of the first clutch C1D and the gear train 2Da.

The torque converter 7 is provided with a pump impeller 7a, a turbine runner 7b, and a lock-up clutch 7c. The pump impeller 7a connected to the power source 1 integrally rotates with an output shaft 1a of the power source 1. The turbine runner 7b connected to the input shaft 2a of the automatic transmission 2D integrally rotates with the input shaft 2a. The lock-up clutch 7c is a frictionally engaging engaging unit provided between the output shaft 1a of the power source 1 and the input shaft 2a of the automatic transmission 2D. The lock-up clutch 7c in an engaged state mechanically connects the power source 1 to the transmission main body 2D1. According to this, the pump impeller 7a and the turbine runner 7b integrally rotate with each other. On the other hand, when the lock-up clutch 7c is in a disengaged state, the pump impeller 7a and the turbine runner 7b transmit torque through fluid.

A hydraulic actuator 8 operated by operating oil controls engaging operation and disengaging operation of the lock-up clutch 7c. The ECU 6 which stores a lock-up clutch operation map created in advance based on the detection results of the vehicle speed and the accelerator opening and the like outputs a control signal to the hydraulic actuator 8 with reference to the same. The hydraulic actuator 8 controls engagement and disengagement of the lock-up clutch 7c based on the control signal.

Figure 14:
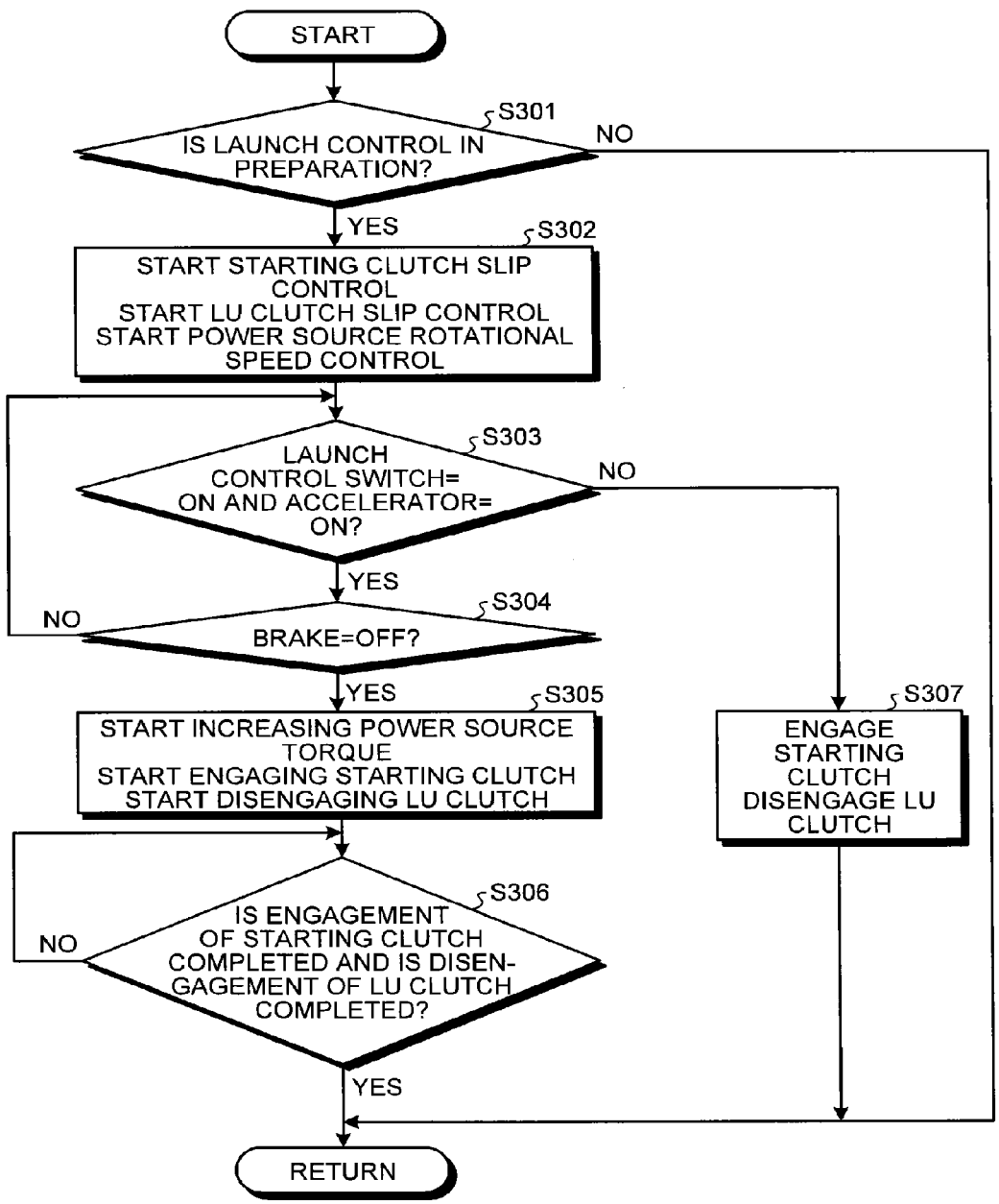
FIG. 14 is a flowchart illustrating an example of control according to the embodiment applied to the vehicle in FIG. 13.

An example of the control according to this embodiment applied to the vehicle in FIG. 13 is hereinafter specifically described with reference to a flow chart illustrated in FIG. 14, a time chart illustrated in FIG. 15, and a collinear diagram illustrated in FIG. 16. Meanwhile, a control routine illustrated in FIG. 14 is repeatedly executed for each control cycle of few ms to tens of ms, for example, while the vehicle 100B stops after an ignition switch of the vehicle 100B is turned on.

Figure 15:
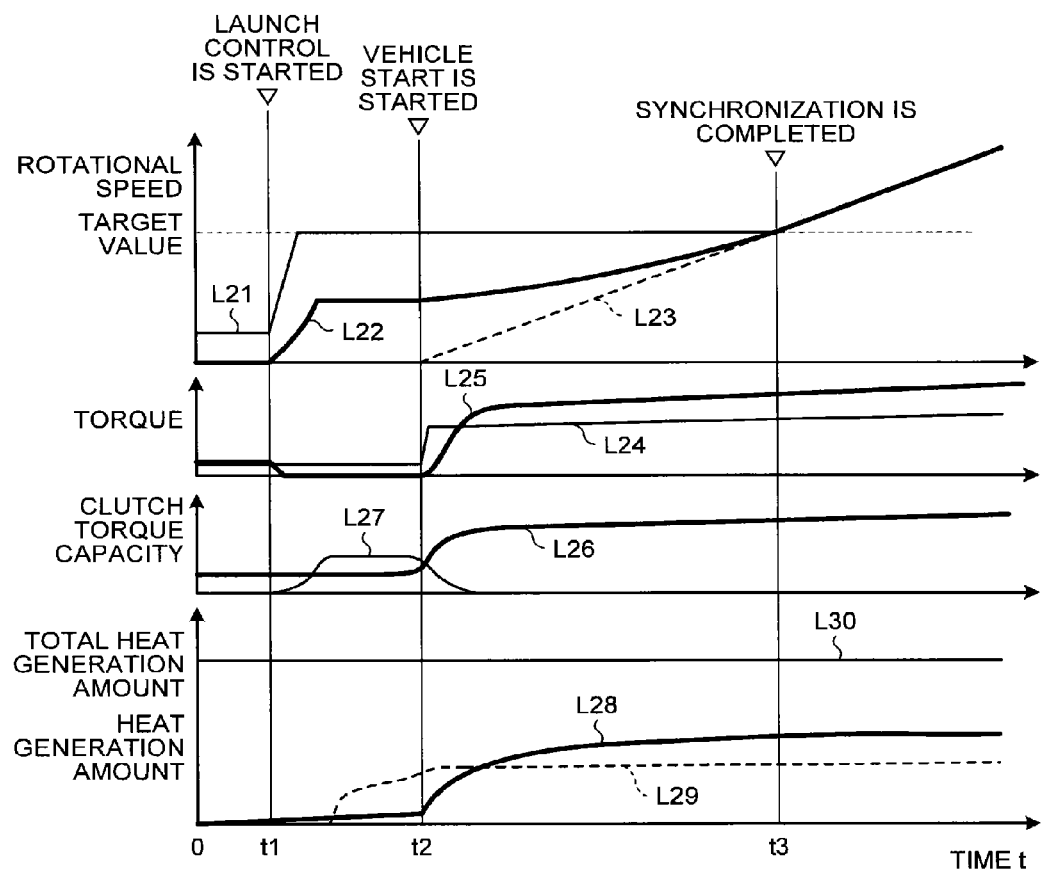
FIG. 15 is a time chart illustrating an example of the control according to the embodiment applied to the vehicle in FIG. 13.

In FIG. 15, line L21 indicates a power source rotational speed of the power source 1, line L22 indicates an input shaft rotational speed of the input shaft 2a of the automatic transmission 2D, and line L23 indicates a vehicle speed converted from the rotational speed of the input shaft 2a. Line L24 indicates power source torque of the power source 1 and line L25 indicates drive torque transmitted to the drive wheel 4. Lines L26 and L27 indicate clutch torque capacities of the first clutch C1D and the lock-up clutch 7c, respectively. Lines L28 and L29 indicate the heat generation amounts of the first clutch C1D and the lock-up clutch 7c, respectively. Meanwhile, line L30 is described below.

First, at time t=0 in FIG. 15, the ECU 6 executes step S301. That is to say, at step S301, the ECU 6 determines whether the launch control is in preparation. The ECU 6 determines that the launch control is in preparation when the launch control switch is turned on, the accelerator opening is not smaller than a predetermined value, and the brake is stepped on. When it is determined that the launch control is in preparation (Yes at step S301), the procedure shifts to step S302. When determining that the launch control is not in preparation (No at step S301), the ECU 6 finishes the process to return.

At time t=t1 in FIG. 15, the ECU 6 executes step S302. That is to say, at step S302, a parameter obtaining unit of the ECU 6 obtains the accelerator opening and the set level of the launch control as the parameters indicating the requested acceleration by the driver when the vehicle starts. The slip control unit of the ECU 6 sets the number of clutches on which slip control should be performed to two (that is to say, first clutch C1D and lock-up clutch 7c) according to the parameters. Meanwhile, a relationship between a value of the parameter and the number of clutches on which the slip control should be performed is stored in the ECU 6 as a control map created by an evaluation result in advance and the like. The slip control unit of the ECU 6 starts the slip control in which difference in rotational speed occurs between the engaging elements frictionally engaging with each other on the first clutch C1D and the lock-up clutch 7c. With this, the ECU 6 starts control to increase the power source rotational speed of the power source 1 to a predetermined target value. According to this, the power source rotational speed (line L21) increases from time t1 and the input shaft rotational speed also increases with this. Meanwhile, as for the target value of the power source rotational speed, a value for realizing desired starting acceleration performance estimated from the evaluation result in advance and the like is preferably stored in the ECU 6 as a control map. Correcting the target value of the power source rotational speed by gradient information and μ information of a road surface is more preferable because a slip of the wheel when the vehicle starts may be avoided. The target value of the power source rotational speed may also be directly input by the driver using the launch control switch 15. Thereafter, the procedure shifts to step S303.

At step S303, the ECU 6 determines whether the launch control switch is turned on and an accelerator is stepped on. When it is determined that the launch control is turned on and the accelerator is stepped on (Yes at step S303), the procedure shifts to step S304.

At step S304, the ECU 6 determines whether the brake is stepped off. When the brake is not stepped off (No at step S304), the procedure returns to step S303, and when the brake is stepped off (Yes at step S304), the procedure shifts to step S305.

At time t=t2 in FIG. 15, the ECU 6 executes step S305. That is to say, at step S305, the ECU 6 starts increasing the power source torque in FIG. 15 and starts engaging the first clutch C1D and disengaging the lock-up clutch 7c being the starting clutches, then shifts to step S306. According to this, the power source torque (line L24) and the drive torque (line L25) increase as illustrated in FIG. 15, the vehicle 100B starts starting by the launch control, and the vehicle speed (line L23) increases. The clutch torque capacity (line L26) and the heat generation amount (line L28) gradually increase by the engagement of the first clutch C1D and thereafter approach steady values. On the other hand, the clutch torque capacity (line L27) and the heat generation amount (line L28) gradually decrease by the disengagement of the lock-up clutch 7c and thereafter approach steady values. The clutch torque capacity of the first clutch C1D at the time of engagement is set based on a relationship between the drive torque which should be transmitted to the drive wheel 4 for realizing the desired starting acceleration performance and a gear ratio of a first-speed gear stage being a gear stage of the automatic transmission 2D when the vehicle starts. As for this relationship, it is preferable to create a control map from the evaluation result in advance and the like to store in the ECU 6. It is possible to inhibit the shock due to change in differential rotational speed of the starting clutch by engaging such that the differential rotational speed of the first clutch C1D substantially monotonously decreases at the time of engagement.

Subsequently, at step S306, the ECU 6 determines whether the engagement and the disengagement of the first clutch C1D and the lock-up clutch 7c being the starting clutches are completed. When the engagement and the disengagement are not completed (No at step S306), the ECU 6 repeats step S306, and when the engagement and the disengagement are completed (Yes at step S306), the ECU 6 finishes the process to return. Meanwhile, when the engagement and the disengagement are completed, synchronization of the power source 1 with the automatic transmission 2D is completed (corresponding to time t=t3 in FIG. 15) and the rotational speeds indicated by lines L21 and L22 become the same.

On the other hand, when the launch control switch is turned off or the accelerator is stepped off at step S303 (No at step S303), the ECU 6 shifts to step S307 to engage the first clutch C1D and disengage the lock-up clutch 7c being the starting clutches. In this case, the vehicle 100B starts without the launch control by the engagement of the first clutch C1D.

Figure 16:
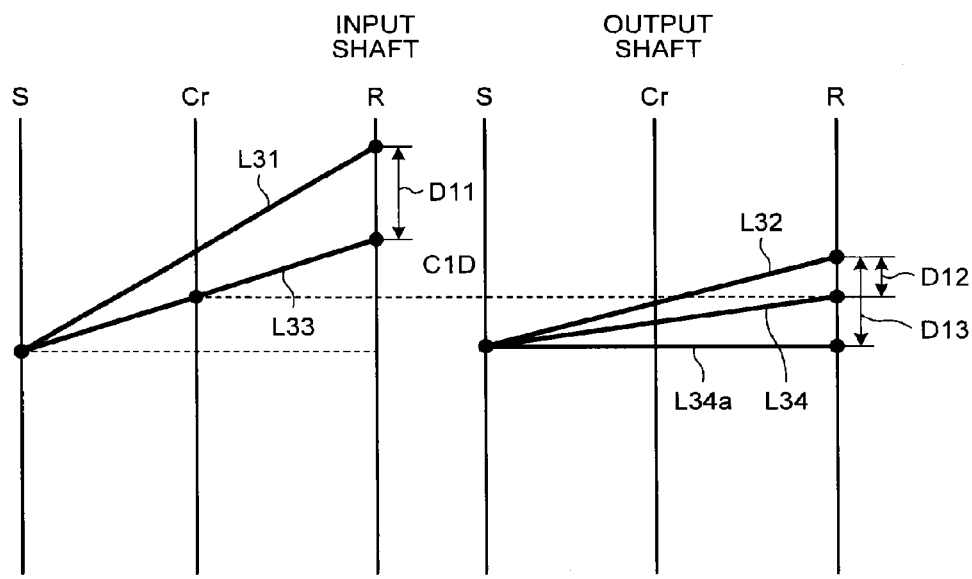
FIG. 16 is a collinear diagram when the vehicle starts according to an example of the control according to the embodiment applied to the vehicle in FIG. 13.

Herein, in the collinear diagram in FIG. 16, lines L31 and L32 indicate a state in which the first clutch C1D is engaged after the vehicle starts, and lines L33 and L34 indicate a state after the launch control is started until the vehicle starts. As illustrated in FIG. 16, the slip control is performed on the first clutch C1D and the lock-up clutch 7c after the launch control is started until the vehicle starts, and there is difference in rotational speed of difference D12 in the first clutch C1D as compared to the engaged state and there is difference in rotational speed of difference D11 in the lock-up clutch 7c as compared to the disengaged state. According to this, each of the first clutch C1D and the lock-up clutch 7c generates heat; however, the heat generation amount is distributed to the respective clutches by the slip control of the two clutches, so that the heat generation amount in each clutch becomes smaller than that when the slip control is performed on one starting clutch.

For example, a case in which the slip control is performed only on the first clutch C1D when the vehicle starts by the launch control in the automatic transmission 2D is considered as comparison. A state of this case is indicated by line L34a in FIG. 16. In this case, difference in rotational speed of difference D13 occurs in the first clutch C1 as compared to the engaged state. As a result, the heat generation amount of the first clutch C1D changes with time so as to approach line L30 in FIG. 15, so that the heat generation amount becomes larger as compared to the case in which the slip control is performed on the two starting clutches. Herein, line L30 indicates a total heat generation amount supposed to be generated in the starting clutch by the slip control when the launch control is performed.

In this manner, according to this control, the heat generation amount in each clutch becomes smaller when the launch control is performed also in the automatic transmission 2D including the lock-up clutch as the engaging unit, so that deterioration in starting clutch may be inhibited.

Herein, the shock is likely to occur when the vehicle starts in a case in which the lock-up clutch 7c and the starting clutch are simultaneously controlled and a case in which the torque control accuracy of the starting clutch is low. On the other hand, when the requested acceleration by the driver when the vehicle starts is low, or when the allowable heat generation amount of the starting clutch is sufficiently larger than a supposed heat generation amount, the occurrence of shock described above is avoided or the shock is inhibited by the control to decrease the number of clutches on which the slip control is performed without performing the slip control of the lock-up clutch 7c.

Figure 17:
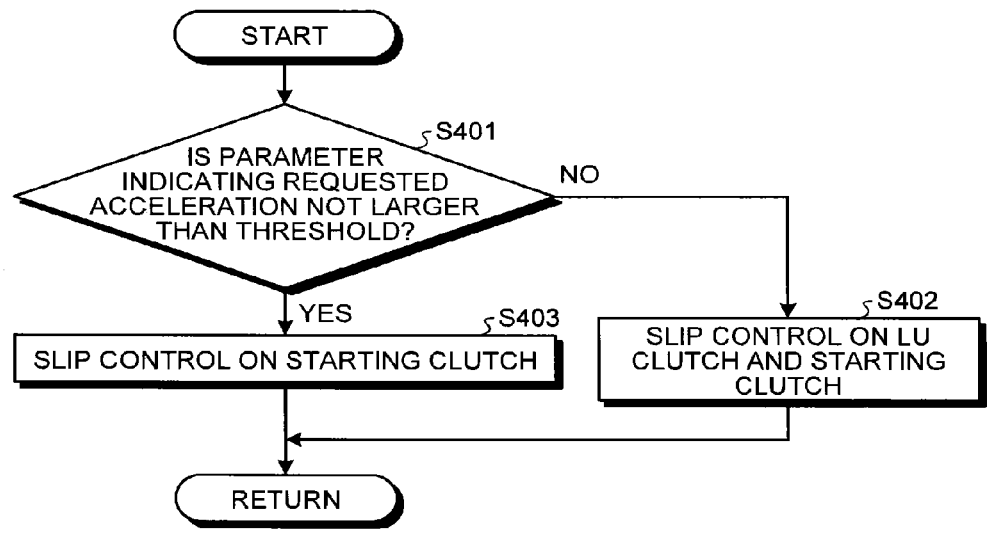
FIG. 17 is a flowchart illustrating an example of control to set the number of clutches on which slip control is performed in the control according to the embodiment applied to the vehicle in FIG. 13.

FIG. 17 is a flowchart illustrating an example of control to set the number of clutches on which the slip control is performed. The control illustrated in FIG. 17 is executed when the ECU 6 sets the number of clutches on which the slip control should be performed. First, at step S401, the ECU 6 determines whether the parameter (accelerator opening and level set by the launch control switch 15) indicating the requested acceleration by the driver when the vehicle starts is not larger than a predetermined threshold. When the parameter is larger than the threshold (No at step S401), the ECU 6 determines to perform the slip control on two clutches (that is to say, first clutch C1D and lock-up clutch 7c) at step S402 and finishes the process to return. On the other hand, when the parameter is not larger than the threshold (Yes at step S401), the ECU 6 determines to perform the slip control only on the first clutch C1D at step S403 and finishes the process to return.

In this manner, the ECU 6 sets the number of clutches on which the slip control is performed to be larger as the requested acceleration indicated by the parameter is higher, and sets the number of clutches on which the slip control is performed to be smaller as the requested acceleration is lower, so that it is possible to avoid the occurrence of the shock when the vehicle starts or inhibit the shock while inhibiting the deterioration in starting clutch. Especially, when the requested acceleration is low and the acceleration when the vehicle starts is low, the shock is likely to be felt, so that it is more effective to set in the above-described manner.

[Control to Prohibit Execution of Launch Control]

FIG. 18 is a flowchart illustrating another example of the control according to the embodiment applied to the vehicle in FIG. 13. In this control, control to prohibit execution of the launch control is performed when temperature of the first clutch C1D being the starting clutch of the automatic transmission 2D is high. Meanwhile, in this control example, oil temperature (TM oil temperature) of the operating oil used for hydraulically controlling the first clutch C1D is used as a parameter indicating the temperature of the first clutch C1D. The vehicle 100B in FIG. 13 is provided with an oil temperature sensor which detects the TM oil temperature, and the oil temperature sensor is electrically connected to the ECU 6 so as to output a detection result to the ECU 6.

First, the ECU 6 executes step S501. That is to say, at step S501, the ECU 6 determines whether the launch control is in preparation. When it is determined that the launch control is in preparation (Yes at step S501), the procedure shifts to step S502. When determining that the launch control is not in preparation (No at step S501), the ECU 6 finishes the process to return.

At step S502, the parameter obtaining unit of the ECU 6 obtains the accelerator opening and the set level input from the launch control switch 15 as the parameters indicating the requested acceleration by the driver when the vehicle starts. The slip control unit of the ECU 6 sets the number of clutches on which the slip control should be performed to two (that is to say, first clutch C1D and lock-up clutch 7c) according to the parameter. The slip control unit of the ECU 6 starts the slip control in which difference in rotational speed occurs between the engaging elements frictionally engaging with each other on the first clutch C1D and the lock-up clutch 7c. With this, the ECU 6 starts control to increase the power source rotational speed of the power source 1 to a predetermined target value. Thereafter, the procedure shifts to step S503.

At step S503, the ECU 6 determines whether the launch control switch is turned on, the accelerator is stepped on, and the TM temperature is lower than a threshold. Meanwhile, the threshold is set according to the allowable heat generation amount and the like of the starting clutch to be stored in the ECU 6. When it is determined that the launch control is turned on, the accelerator is stepped on, and the TM oil temperature is lower than the threshold (Yes at step S503), the procedure shifts to step S504.

At step S504, the ECU 6 determines whether the brake is stepped off. When the brake is not stepped off (No at step S504), the procedure returns to step S503, and when the brake is stepped off (Yes at step S504), the procedure shifts to step S505.

At step S505, the ECU 6 starts increasing the power source torque, starts engaging the first clutch C1D being the starting clutch, then starts disengaging the lock-up clutch 7c at step S506, then shifts to step S507.

Subsequently, at step S507, the ECU 6 determines whether the engagement of the first clutch C1D being the starting clutch is completed and the disengagement of the lock-up clutch 7c is completed. When the engagement and the disengagement are not completed (No at step S507), the ECU 6 repeats step S507, and when the engagement is completed (Yes at step S507), the ECU 6 finishes the process to return.

On the other hand, when the launch control switch is turned off, the accelerator is stepped off, or the TM oil temperature is not lower than the threshold at step S503 (No at step S503), the ECU 6 shifts to step S508 to engage the first clutch C1D being the starting clutch and disengage the lock-up clutch 7c. This case corresponds to a case in which the driver no longer has the intention to perform the launch control or a case in which the execution of the launch control is prohibited due to high TM oil temperature; the vehicle 100B starts without the launch control by the engagement of the first clutch C1D.

Since the execution of the launch control is prohibited when the TM oil temperature is not lower than the threshold in this manner, a load on the first clutch C1D being the starting clutch is not increased, so that deterioration in starting clutch may be inhibited.

Meanwhile, although the TM oil temperature is used as the parameter indicating the temperature of the first clutch CUD in the above-described control, when the vehicle is provided with a temperature sensor which detects the temperature of the first clutch C1D, the ECU 6 may also determine whether to perform or prohibit the launch control according to the temperature of the first clutch C1D.

It is also possible to perform control in which the launch control switch 15 cannot be turned on by the driver when the TM oil temperature is not lower than the threshold in place of the above-described control. It is also possible to prohibit the execution of the launch control by such control.

Although the ECU 6 determines that the launch control is in preparation when the launch control switch is turned on, the accelerator opening is not smaller than a predetermined value, and the brake is stepped on in the above-described embodiment, a method of determining whether the launch control is in preparation is not limited to this. For example, the ECU 6 may determine that the launch control is in preparation when a state in which the accelerator opening is not smaller than a predetermined value and the brake is stepped on continues for predetermined time or longer while the vehicle stops.

In the above-described embodiment, the parameter obtaining unit of the ECU 6 obtains the accelerator opening input from the accelerator opening sensor 12 and the set level input from the launch control switch 15 as the parameters indicating the requested acceleration by the driver when the vehicle starts. However, there is a case in which the ECU 6 sets an upper limit value for avoiding or inhibiting the slip of the wheel when the vehicle starts as the upper limit value of the requested acceleration from the gradient information and the μ information of the road surface obtained from the sensor mounted on the vehicle 100. In this case, the parameter obtaining unit may also obtain a parameter indicating the upper limit value of the requested acceleration described above as the parameter indicating the requested acceleration when the vehicle starts.

Although a stepped automatic transmission is illustrated in the above-described embodiment, the present invention is not limited to this, and a continuously variable automatic transmission provided with the engaging unit as the starting clutch which engages when the vehicle starts may also be used.

According to the disclosure, it is possible to adjust a heat amount generated in an engaging unit when a vehicle starts by setting the number of engaging units on which slip control is performed according to a value of a parameter indicating requested acceleration when the vehicle starts, so that there is an effect that deterioration in starting clutch may be inhibited.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device mounted on a vehicle provided with a power source and an automatic transmission including a plurality of engaging units including engaging elements frictionally engaging with each other, the automatic transmission allowing or blocking power transmission between the power source and a drive wheel of the vehicle by controlling engagement of the plurality of engaging units, the control device comprising:

a controller configured to perform control to increase a rotational speed of the power source when a brake is stepped on and accelerator opening becomes a predetermined value or larger while the vehicle stops, and thereafter, when the brake is stepped off, engage the plurality of engaging units to transmit the power, and start the vehicle, the controller including:
a parameter obtaining unit configured to obtain a parameter indicating requested acceleration when the vehicle starts; and
a slip control unit configured to perform slip control on at least one of the plurality of engaging units such that difference in rotational speed occurs between the engaging elements and a number of engaging units on which the slip control is performed according to a value of the parameter when the vehicle starts.

2. The control device according to claim 1, wherein the slip control unit sets the number of engaging units on which the slip control is performed to be larger as the requested acceleration indicated by the parameter is higher.

3. The control device according to claim 1, wherein the slip control unit sets the number of engaging units on which the slip control is performed to be smaller as the requested acceleration indicated by the parameter is lower.

4. The control device according to claim 1, wherein the slip control unit sets the number of engaging units on which the slip control is performed to be smaller as an allowable heat generation amount of the engaging unit is larger.

5. The control device according to claim 1, wherein the slip control unit sets the number of engaging units on which the slip control is performed such that a heat generation amount generated in the engaging unit on which the slip control is performed does not become larger than an allowable heat generation amount of the engaging unit.

6. The control device according to claim 1, wherein
the automatic transmission is configured to set a gear stage by setting a combination of the engaging units to be engaged, and
the slip control unit sets an engaging unit of the number of engaging units on which the slip control is performed to an engaging unit disengaged when a highest gear stage next to a gear stage when the vehicle starts.

7. The control device according to claim 1, wherein the automatic transmission is provided with a torque converter including a lock-up clutch, and the plurality of engaging units includes the lock-up clutch.

* * * * *